United States Patent [19]

Hirabayashi et al.

[11] 4,431,212
[45] Feb. 14, 1984

[54] JACKING POINT STRUCTURE

[75] Inventors: Hirokazu Hirabayashi, Tokyo; Hirotaka Tomioka; Shuji Yamagata, both of Yokohama, all of Japan

[73] Assignee: Nissan Motor Company, Limited, Kanagawa, Japan

[21] Appl. No.: 267,781

[22] Filed: May 28, 1981

[30] Foreign Application Priority Data

May 29, 1980 [JP] Japan .................................. 55-72049

[51] Int. Cl.³ .......................... B60D 1/04; B60D 1/16
[52] U.S. Cl. ............................... 280/762; 24/230.5 R; 114/249; 280/402; 280/480; 296/204
[58] Field of Search ..................... 296/204; 180/292; 280/785, 800, 762, 480, 402; 24/230 AK, 230.5 R; 114/230, 249

[56] References Cited

U.S. PATENT DOCUMENTS

| 4,040,640 | 8/1977 | Begg | 296/204 |
| 4,180,281 | 12/1979 | Tertinek | 280/480 |

FOREIGN PATENT DOCUMENTS

| 1177499 | 9/1964 | Fed. Rep. of Germany | 280/480 |
| 7200980 | 4/1972 | Fed. Rep. of Germany | 280/480 |
| 50-39541 | 11/1975 | Japan | 280/480 |

*Primary Examiner*—Richard A. Bertsch
*Attorney, Agent, or Firm*—Lowe, King, Price & Becker

[57] ABSTRACT

A jacking point structure for an automotive vehicle, includes a bracket fixed to the underside of a trunk compartment at a rear portion of the vehicle, and a hook fixed to the bracket. The bracket has a first wall extending horizontally and a second wall extending vertically. Also, the bracket has a channel portion at its center which functions as a jacking point preferably at the rear end of the first wall. The hook extends horizontally in the backward direction of the vehicle and does not project downwardly. It is preferable that the hook is formed in a U-shape and welded at its legs to the first wall in such a manner that the channel portion of the bracket is held between the legs of the hook.

10 Claims, 9 Drawing Figures

JACKING POINT STRUCTURE

BACKGROUND OF THE INVENTION

The present invention relates to a jacking point structure for use when a rear end of an automotive vehicle is raised by a jack, and more particularly relates to a jacking point structure equiped with a jacking point and hook for pulling the vehicle body.

In case of repairs or the like, a garage jack or other jacks are used in order to jack up both rear wheels of an automotive vehicle. As a jacking point, a variety of suspension parts have been used.

For instance, in so called "FR" vehicles in which an engine is provided at a front portion of the vehicle and the rear wheels thereof are driven, a banjo or a casing for a differential gear is used as a jacking point.

In so called "FF" vehicles wherein an engine is provided at a front portion of the vehicle and the front wheels thereof are driven, including four-wheel independent suspension means, no proper suspension part can be provided as a jacking point. Thus, it is required to provide additionally a special jacking point.

Japanese Utility Model Publication No. 50-39541 shows a conventional jacking point structure. A projection is formed on the underside of a rear portion of a vehicle body to constitute a jacking point. Further, a hole is formed laterally in the projection to constitute a hook for pulling the vehicle.

A hook for pulling the vehicle is welded so as to project downwardly from the underside of a rear portion of the vehicle body. In this case, such a hook is used also as a jacking point.

FIGS. 1 to 3 show such a conventional jacking point. A hook 1 for pulling an automotive vehicle A is welded to the underside of a rear portion of the vehicle as a jacking point. In general, hook 1 is fixed to the rear end of a spare tire housing 4 formed at a floor 3 of a trunk compartment or room 2 positioned at a rear portion of the vehicle body.

Hook 1 is formed of a U-shaped bar with a circular section. As shown in FIG. 3, one end 5 of the hook 1 is welded to the bottom of spare tire housing 4 in the longitudinal direction of the vehicle body while the other end 6 thereof is vertically welded to the back side of the spare tire housing. A curved portion of hook 1 which is used as a jacking point projects downwardly from the underside of the vehicle body. A jack J engages the curved portion of hook 1.

In such a jacking point structure, however, the width or thickness in a lateral direction of the hook 1 is narrow or small so that stability of the vehicle when jacked up is low. Since hook 1 projects downwardly, when another hook H pulls the hook in the direction shown by the arrow in FIG. 3, i.e. backwards, a moment occurs at the welded portions of ends 5, 6 of hook 1 so that there is a possibility that the welded portions may be broken.

Also, hook 1 must have an opening sufficient to fixedly receive another hook or rope. Thus, hook 1 projects downwardly to a large extent (e.g., 60-70 mm) from the underside to the vehicle body causing the bottom of the hook to easily contact the ground, particularly under rough road conditions. If a reinforcing member is added to increase the strength of the welded portions between the spare tire housing and hook 1, the hook projects downwardly to an extremely large extent.

SUMMARY OF THE INVENTION

An object of the present invention is to provide a jacking point structure of an automotive vehicle wherein a jacking point and a hook for pulling the vehicle are compactly arranged.

A further object of the present invention is to provide a jacking point structure wherein the hook can be prevented from contacting the ground.

Still another object of the present invention is to provide a jacking point structure facilitating formation of larger trunk compartments.

Another object of the present invention is to provide a jacking point structure wherein the strength of a hook for pulling the vehicle can be increased.

Accordingly, a jacking point structure of an automotive vehicle according to the present invention includes a bracket fixed to the underside of a rear portion of the vehicle. The bracket has a portion functioning as a jacking point. Further, a hook for pulling the vehicle is fixed to the bracket. Preferably, the hook is formed of a U-shape, having opposite ends or legs. The legs of the hook are welded onto opposite sides of the bracket. Also, the hook has a curved portion projecting rearwardly of the vehicle.

DETAILED DESCRIPTION OF THE PREFERRED EMBODIMENTS

Figure 1:
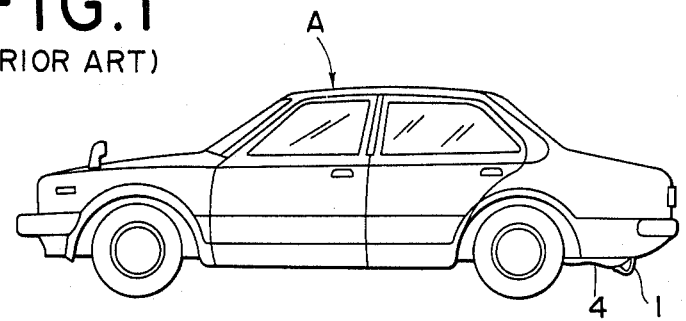
FIG. 1 shows a conventional automotive vehicle equipped with a prior art jacking point structure.
Figure 2:
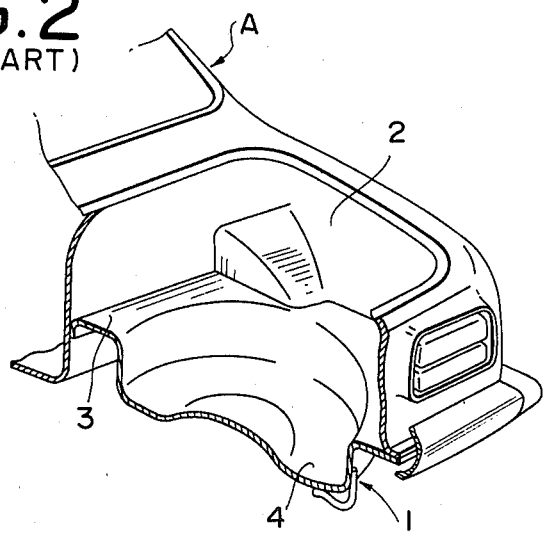
FIG. 2 is a partial perspective view showing a rear portion of the vehicle illustrated in FIG. 1.
Figure 3:
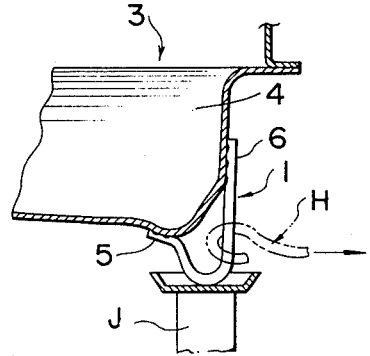
FIG. 3 is a sectional view showing an essential portion of the rear portion as shown in FIG. 2.
Figure 4:
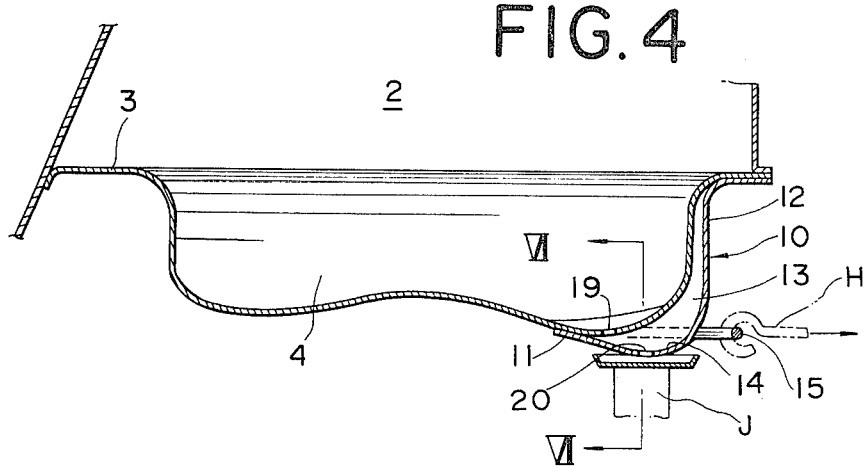
FIG. 4 is a sectional view showing a rear portion of an automotive vehicle equipped with a jacking point structure according to an embodiment of the present invention.

Referring now to FIG. 4, a bracket 10 is fixed to the underside of a rear portion of an automotive vehicle, for instance, a rear portion of a spare tire housing 4 of a recessed shape formed in a floor panel 3 of a trunk or compartment 2.

Figure 5:
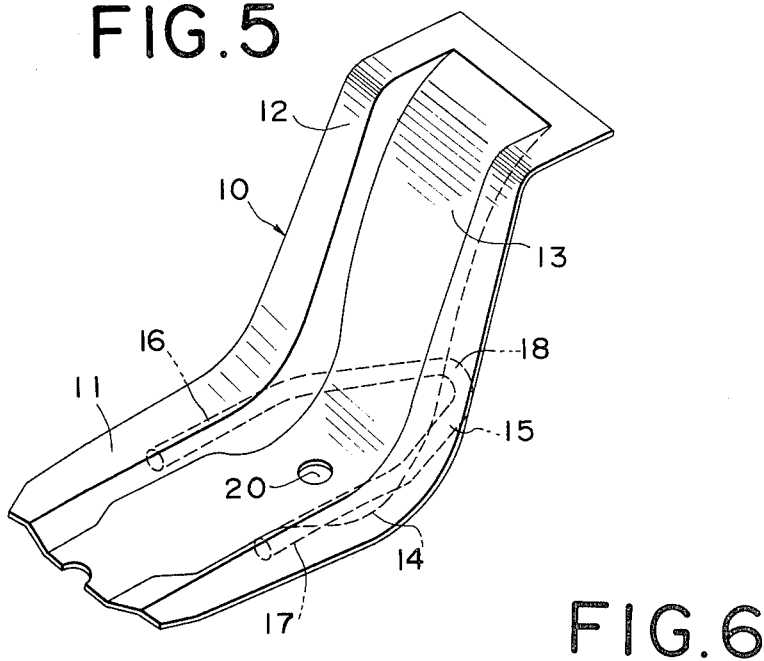
FIG. 5 is a perspective view showing a bracket and hook used in the jacking point structure illustrated in FIG. 4.

As shown in FIGS. 4 and 5, bracket 10 may be formed L-shaped in section, including a first wall 11 affixed to the bottom of spare tire housing 4 and a second wall 12 affixed to the back side thereof. Also, bracket 10 includes a channel portion 13 formed between first wall 11 and second wall 12. The deepest portion of channel 13 is located at the rear end of first wall 11. The deepest portion of channel 13 is also formed so that a small space is provided between the channel and spare tire housing 4. Thus, the deepest portion of channel 13 constitutes a jacking point 14 for a jack J. In other words, jack J engages jacking point 14 at the deepest portion of channel portion 13.

The jacking point 14 of bracket 10 only slightly projects downwardly from spare tire housing 4. In another mode of the present invention, the jacking point 14 or the deepest portion of the channel portion 13 may be set substantially at the same level of the bottom of the spare tire housing 4.

Figure 6:
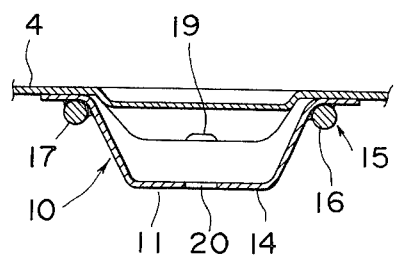
FIG. 6 is a sectional view taken along the line VI—VI in FIG. 4.
Figure 7:
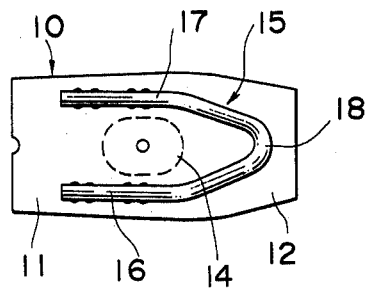
FIG. 7 is a bottom view of the bracket and the hook as shown in FIG. 5.

Both legs or ends 16, 17 of a U-shaped hook 15 for pulling the vehicle are welded to the underside of first wall 11 so that channel portion 13 is between the legs 16, 17. Hook 16 is preferably formed of a bar having a circular section as shown in FIGS. 5 to 7. A curved portion 18 of hook 15 projects horizontally rearwardly of the vehicle.

Hook 15 may be formed of other shapes or members than a bar. For example, as shown in FIGS. 8 and 9, the hook 15 may be formed as a plate-like member spot-welded to the underside of bracket 10.

Referring again to FIGS. 4 and 6, a drain hole 19 formed in the bottom of spare tire housing 4 is covered by bracket 10 so that the bracket functions as a splash guard. Splash can be prevented from entering through drain hole 19 into the trunk compartment. A drain hole 20 formed in bracket 10 at the deepest point or jacking point 14 is offset from drain hole 19 so that these drain holes do not align.

Figure 8:
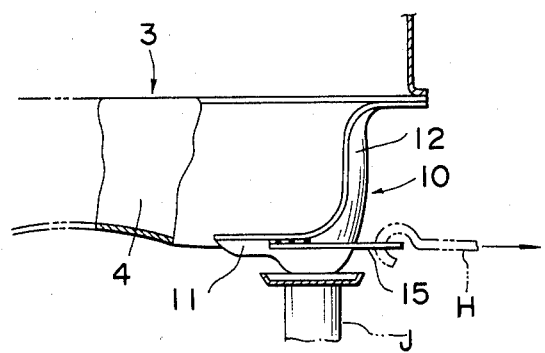
FIG. 8 is a side view showing a jacking point structure according to a further embodiment of the present invention.
Figure 9:
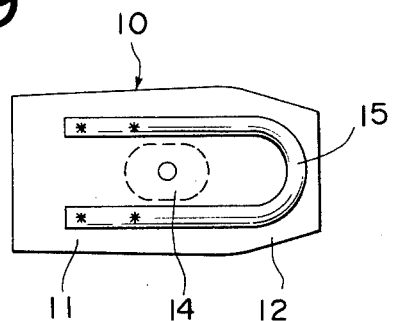
FIG. 9 is a bottom view showing an essential portion of the jacking point structure as shown in FIG. 8.

FIGS. 4 and 8 show a condition in which jack J is actuated to jack up the rear end of the vehicle by elevating jacking point 14.

According to the present invention, the jacking point may have a wide flat portion so that the head of the jack J can stably engage the jacking point, assuming safe jacking conditions.

As hook 15 projects backwardly and not downwardly, the hook is easily prevented from contacting the ground. Also, the inner space of the trunk compartment can be increased because the trunk floor panel can be set at a low level.

When the vehicle is pulled by having hook J engage another hook H in the direction of the arrows in FIGS. 4 and 8, the welded portions of legs 16, 17 receive shearing force rather than moment. As wellknown, the welded portions have a good resistance against shearing force. For such a reason, the strength of the welded portions according to the present invention is increased as compared with the prior art.

The jacking point 14 is located in a space between the legs 16, 17 of hook 15 under the vehicle body. Thus, such a space can be effectively utilized.

The height of the hook and the bracket in combination can be lower than that of the prior art so that repairs or the like of members under the rear portion of the vehicle can be easily done. A departure angle can be large.

What is claimed is:

1. A jacking point structure attached to a lower portion of a trunk compartment in an automotive vehicle, comprising:
    a bracket having opposite ends affixed to the underside of the lower portion, said bracket having a jacking point at a central portion thereof; and
    a hook having a pair of legs affixed to the bracket and a curved portion positioned between the legs, each leg having an end portion respectively secured to opposite sides of the bracket and extending longitudinally at the point of contact with the bracket, with the curved portion located intermediate said hook ends and projecting rearwardly from the automotive vehicle, said curved portion being engageable with a towing hook to thereby transmit towing forces to the bracket through both hook ends and to the housing through the bracket ends as shear force.

2. A jacking point structure of claim 1, wherein the hook is U-shaped and extends in a generally horizontal plane.

3. A jacking point structure of claim 2, wherein the central portion of the bracket extends longitudinally between the legs of the hook.

4. A jacking point structure of claim 2, wherein the bracket has a substantially L-shaped longitudinal cross-section and includes a first wall extending horizontally, a second wall extending vertically, and a longitudinally extending channel portion formed centrally within the first and second walls, a downwardly facing surface of the channel defining the jacking point, transverse end portions of the first and second walls transmitting shear forces to the lower portion.

5. A jacking point structure of claim 4, wherein said channel portion extends between and is welded to the legs of said hooks.

6. A jacking point structure for elevating or towing an automotive vehicle at its rear end, said vehicle having a vehicle body, a trunk compartment arranged at a rear portion of the vehicle body, a spare tire housing of recessed shape formed in the bottom of the trunk compartment and a rear portion thereof;
    a bracket having a first wall, a second wall, and a channel portion formed in the first wall said first wall extending horizontally and being attached to an underside of the housing, the second wall extending vertically and including a horizontal end portion secured on the housing underside, the channel portion functioning as a jacking point; and
    a hook having two legs secured to the first wall so that the channel portion extends between the legs, said hook being horizontal and extending rearwardly from the vehicle body.

7. A jacking point structure of claim 6, wherein the jacking point is positioned on the underside of the channel portion at a rear end of the first wall.

8. A jacking point structure of claim 6, wherein the bracket is fixed to the spare tire housing of the trunk compartment in such a manner that a small space is formed between the bracket and the spare tire housing, and wherein a drain hole formed in the bottom of the spare tire housing is shifted from a drain hole formed in the deepest portion of the channel portion of the bracket whereby the bracket can function as a splash guard.

9. A jacking point structure of claims 6 or 8, wherein the hook is formed in a U-shape.

10. A jacking point structure attached to a lower portion of a trunk compartment in an automotive vehicle, comprising a hook having a pair of substantially straight parallel legs interconnected by a curved portion, each leg having an end portion connected to the lower portion of the trunk compartment so as to extend longitudinally in an area of contact therewith, the hook legs and curved portion lying in a common, generally horizontal plane, the curved portion extending rearwardly and being engageable with a towing hook having a curved free end at a point remote from the hook ends to transmit towing forces through each end to the lower portion of the trunk compartment substantially entirely as shear forces.

* * * * *

UNITED STATES PATENT AND TRADEMARK OFFICE
CERTIFICATE OF CORRECTION

PATENT NO. : 4,431,212
DATED : February 14, 1984
INVENTOR(S) : Hirokazu Hirabayashi et al It is certified that error appears in the above-identified patent and that said Letters Patent is hereby corrected as shown below:

IN THE ABSTRACT:

Line 2, change "ofr" to --for--;

Line 3, delete the comma after "vehicle";

Line 4, rewrite as follows: "rear trunk compartment and a";

Lines 7, 8, 9, 10 and 11, rewrite as follows: "vertically. The bracket also has a central channel portion preferably formed at a rear end of the first wall which functions as a jacking point. The hook extends horizontally and rearwardly of the vehicle and is";

UNITED STATES PATENT AND TRADEMARK OFFICE
CERTIFICATE OF CORRECTION

PATENT NO. : 4,431,212
DATED : February 14, 1984
INVENTOR(S) : Hirokazu Hirabayashi et al It is certified that error appears in the above-identified patent and that said Letters Patent is hereby corrected as shown below:

ABSTRACT:

Line 12, change "its legs" to --legs thereof--;
Line 13, change "in such a manner" to --so--; and
Line 14, rewrite as "bracket is between the hook legs."

Signed and Sealed this

Fifth Day of November 1985

[SEAL]

Attest:

Attesting Officer

DONALD J. QUIGG

Commissioner of Patents and Trademarks